United States Patent
Barkaszi et al.

(10) Patent No.: US 10,437,768 B2
(45) Date of Patent: Oct. 8, 2019

(54) METHOD AND HOST NODE FOR CONFIGURING A REMOTE NODE AND A HOST NODE

(71) Applicant: TELEFONAKTIEBOLAGET LM ERICSSON (PUBL), Stockholm (SE)

(72) Inventors: Mihaly Barkaszi, Budapest (HU); Tom Rehnström, Märsta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/743,221

(22) PCT Filed: Jul. 9, 2015

(86) PCT No.: PCT/SE2015/050812
§ 371 (c)(1),
(2) Date: Jan. 9, 2018

(87) PCT Pub. No.: WO2017/007388
PCT Pub. Date: Jan. 12, 2017

(65) Prior Publication Data
US 2018/0196773 A1  Jul. 12, 2018

(51) Int. Cl.
*G06F 13/00* (2006.01)
*G06F 13/40* (2006.01)
*G06F 13/42* (2006.01)

(52) U.S. Cl.
CPC ...... *G06F 13/4081* (2013.01); *G06F 13/4282* (2013.01); *G06F 13/4295* (2013.01); *G06F 2213/0026* (2013.01)

(58) Field of Classification Search
CPC .... G06F 13/408; G06F 3/4282; G06F 3/4295; G06F 2213/0026
See application file for complete search history.

(56) References Cited

U.S. PATENT DOCUMENTS

| | | | |
|---|---|---|---|
| 8,493,394 B2 * | 7/2013 | Chen | G06F 1/26 345/502 |
| 8,880,747 B2 * | 11/2014 | Bolen | G06F 9/4411 710/10 |
| 2008/0160811 A1 * | 7/2008 | Dunstan | H01R 29/00 439/188 |

(Continued)

OTHER PUBLICATIONS

"PCI Express™ Card Electromechanical Specification Revision 1.1" by PCI-SIG, Mar. 28, 2005 (Year: 2005).*

*Primary Examiner* — Jing-Yih Shyu
(74) *Attorney, Agent, or Firm* — Baker Botts, LLP

(57) ABSTRACT

Embodiments of the present technology presented herein relate to a method for configuring a remote node and to a host node for performing said configuring of the remote node. The present technology presented herein also generally relates to embodiments of a method for reconfiguring the host node and to a reconfigurable host node. More particularly, the embodiments presented herein relate to configuring the remote node and reconfiguring the host by duplicating Peripheral Component Interconnect express, PCIe, hot-plug elements such that they are present at both the host node and the remote node. Furthermore there is introduced a connection state indicator at both the host node and the remote node for indicating that an optical connection has been established between the host and remote node.

10 Claims, 3 Drawing Sheets

(56) References Cited

U.S. PATENT DOCUMENTS

2010/0106881 A1* 4/2010 Daniel ................ G06F 13/4081
710/313
2012/0072633 A1* 3/2012 Elboim ............... G06F 13/4081
710/302

* cited by examiner

METHOD AND HOST NODE FOR CONFIGURING A REMOTE NODE AND A HOST NODE

This application is a national stage application, filed under 35 U.S.C. § 371, claiming priority to international application PCT/SE2015/050812, filed Jul. 9, 2015, the disclosure of which is fully incorporated herein by reference.

TECHNICAL FIELD

Embodiments of the present technology presented herein generally relate to a method for configuring a remote node and to a host node for performing said configuring of the remote node. The present technology presented herein also generally relates to embodiments of a method for reconfiguring the host node and to a reconfigurable host node. More particularly, the embodiments presented herein relate to configuring the remote node and reconfiguring the host node using Peripheral Component Interconnect express, PCIe, hot-plug elements.

BACKGROUND

PCIe is a high-speed serial computer expansion bus standard. PCIe has numerous improvements over the older standards, including higher maximum system bus throughput, lower I/O pin count and smaller physical footprint, better performance scaling for bus devices, a more detailed error detection and reporting mechanism and native hot-plug functionality. Hot-plug functionality or hot-plugging is a term used to describe the functions of replacing computer system components without shutting down the system. With hot-plugging it is possible to add components to expand a system without significant interruption to the operation of the system. Once appropriate software is installed, a user can plug and unplug the components without rebooting the system. A well-known example of this functionality is the Universal Serial Bus, USB that allows users to add or remove peripheral components such as a mouse, keyboard, or printer.

Recent development in PCIe hardware, i.e. PCIe over fiber allows placing connected elements at distant locations, e.g in different cabinets or even in different rooms/floors of a building. Hot-plugging over a distance to a remote node had previously not been possible. The new development of the existing PCIe standard prescribes that any hot-plug operation shall be initiated by a manual operation, i.e. a button press by the operator. Consequently, if an operator wants to configure or reconfigure (plug/unplug) the remote end of a fiber cable, the operator has to visit both ends of the fiber cable in order to perform the manual operation. Alternatively, the manual operation requires two operators connected by other means such that they can communicate with each other, eg. by cellular telephone.

A more thorough description of the PCIe standard and hot-plugging may be found in "PCI Express Base Specification, Revision 3.0", "PCI Hot-Plug Specification, Revision 1.1" and "PCI Standard Hot-Plug Controller and Subsystem Specification, Revision 1.0".

As mentioned above recent developments allow placing connected elements at a distant location. However, currently existing standards and solutions do not suggest any solutions for dealing with hot-pluggable components at a distant location, i.e. physically separated from a hot-plug controller of an uplink port.

SUMMARY

It is in view of the above considerations and others that the various embodiments disclosed herein have been made.

In one of its aspects, the technology presented herein concerns a method for configuring a remote node connected to a first end of an optical cable. The optical cable is configured for communication between the remote node and a host node, which both comprise Peripheral Component Interconnect express, PCIe, hot-plug elements and a connection state indicator. The method comprises plugging a second end of the optical cable into the host node and determining, by means of a hot-plug controller in the host node, the status of the connection state indicator of the host node. If the connection state indicator indicates that an optical connection has been established between the remote node and the host node the method further comprises, activating, by means of the hot-plug controller, an attention button of the hot-plug elements, requesting, by means of the hot-plug controller, a hot-plug system driver of the host node to configure the remote node and configuring the remote node. When the configuring process of the remote node has been terminated, turning on, by means of the hot-plug controller, a power indicator Light Emitting Diode, LED.

Advantageously, the method further comprises receiving, at the host node, information about the state of the PCIe hot-plug elements of the remote node via the optical cable. The information about the state of the PCIe hot-plug elements of the remote node may be received at a frequency of 15-30 samples per second.

In another of its aspects, the technology presented herein concerns a host node for configuring a remote node. The host node comprises an optical interface for receiving a second end of an optical cable, the first end of which is connected to an optical interface of the remote node. The optical cable is configured for communication between the remote node and a host node. Both nodes comprise Peripheral Component Interconnect express, PCIe, hot-plug elements and a connection state indicator. The host node is configured to perform different steps in response to plugging the second end of the optical cable into the optical interface of the host node. The different steps comprise to determine, by means of a hot-plug controller in the host node, the status of the connection state indicator of the host node and activate, by means of the hot-plug controller, an attention button of the hot-plug elements in response to determining that the connection state indicator indicates that an optical connection has been established between the remote node and the host node. When the optical connection has been established the host node is further configured to request, by means of the hot-plug controller, a hot-plug system driver to configure the remote node and then configure the remote node. The host node may then be configured to turn on, by means of the hot-plug controller, a power indicator Light Emitting Diode, LED, in response to that the configuring process of the remote node has been terminated.

Advantageously the host node is further configured to receive information about the state of the PCIe hot-plug elements of the remote node via the optical cable. The host node may further be configured to receive the information about the state of the PCIe hot-plug elements of the remote node at a frequency of 15-30 samples per second.

In still another of its aspects the technology presented herein concerns a method for reconfiguring a host node connected to a remote node via an optical cable. The optical cable is configured for communication between the host node and the remote node. Both nodes comprising Peripheral Component Interconnect express, PCIe, hot-plug elements and a connection state indicator. The method comprises activating, by means of a hot-plug controller in the host node, an attention button of the hot-plug elements in response to a decision to remove the optical cable from the host node, requesting, by means of the hot-plug controller, a hot-plug system driver of the host node to remove software elements associated with the remote node and then removing the software elements associated with the remote node from the host node. In response to that the software elements associated with the remote node have been removed, turning off, by means of the hot-plug controller, a power indicator Light Emitting Diode, LED, unplugging the optical cable from the host node, and turning off the connection state indicator.

In some embodiments the step of removing the software elements associated with the remote node from the host node comprises removing information about the state of the PCIe hot-plug elements of the remote node from the host node. Such information about the PCIe hot-plug elements may comprise the state of an attention button, an attention indicator and a power indicator of the remote node.

In yet another of its aspects the technology presented herein concerns a reconfigurable host node connected to a remote node via an optical interface and an optical cable. The optical cable is configured for communication between the host node and the remote node. Both nodes comprise Peripheral Component Interconnect express, PCIe, hot-plug elements and a connection state indicator. The host node is configured to perform the different steps when unplugging the optical cable from the optical interface of the host node. The different steps comprise to activate, by means of a hot-plug controller in the host node, an attention button of the hot-plug elements in response to a decision to remove the optical cable from the host node, request, by means of the hot-plug controller, a hot-plug system driver to remove software elements associated with the remote node and remove the software elements associated with the remote node from the host node. In response to that the software elements associated with the remote node have been removed the host node is further configured to turn off, by means of the hot-plug controller, a power indicator Light Emitting Diode, LED, unplug the optical cable from optical interface of the host node, and turn off the connection state indicator.

In some embodiments the reconfigurable host node is further configured to remove information about the status of the PCIe hot-plug elements of the remote node from the host node. The information about the status of PCIe hot-plug elements may comprise status about an attention button, an attention indicator and a power indicator of the remote node.

Thus, the above aspects describe solutions for cases where hot-pluggable components are at a distant location. By duplicating the PCIe hot-plug elements, namely the Attention Button, Power Indicator and Attention Indicator at the remote node, i.e. at the first far end of the fiber cable, it is possible to initiate a hot-plug event—fiber unplug/plug—at both ends of a long fiber cable. With the solution described herein, an operator may configure/reconfigure any end of a long fiber cable, without the need for visiting the other—untouched—cable end. This means that the configuration and reconfiguration can be carried out by a single person.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The technology will now be described more fully hereinafter with reference to the accompanying drawings, in which certain embodiments are shown. The technology may, however, be embodied in many different forms and should not be construed as limited to the embodiments set forth herein; rather, these embodiments are provided by way of example so that this disclosure will be thorough and complete, and will fully convey the scope of the technology to those persons skilled in the art.

In the "PCI Hot-Plug Specification Revision 1.1" different terms for hot-plugging have been defined. Some of the most important definitions are repeated here for facilitating the understanding of the present disclosure.

Attention Indicator is a physical indicator, located to draw the attention of the user to a particular slot. The Platform is required to provide one Attention Indicator per hot-plug slot. The state of the Attention Indicator is determined by the Hot-Plug Service.

Hot-Plug Controller is a piece of hardware supplied by the Platform vendor that controls the electrical aspects of powering up and down a PCI slot. A single Hot-Plug Controller typically controls more than one slot. A hot-plug Platform is permitted to contain more than one Hot-Plug Controller.

Hot-Plug Service is high-level software that has overall control of hot-plug operations. It includes a user interface, and issues requests to the operating system to quiesce add-in card activity, and issues Hot-Plug Primitives to the Hot-Plug System Driver to turn slots on and off. The Hot-Plug Service is unique to each particular operating system and is generally supplied by the operating-system vendor.

Hot-plug slot is a slot designed in accordance with this specification to allow the insertion and removal of add-in cards without powering down the Platform or restarting the operating system. This is the basic unit of hot-plugability. Individual slots must be isolated from the rest of the Platform for reliable insertion and removal of an add-in card.

Hot-Plug System Driver is a software driver that controls and monitors the Hot-Plug Controller hardware. If there is more than one Hot-Plug Controller in a Platform, some operating systems require more than one Hot-Plug System Driver. The Hot-Plug System Driver is supplied by the Platform vendor.

Platform is the collection of hardware in which the PCI bus resides. Generally includes the power supply, one or more CPUs, a host-bus-to-PCI bridge, and various peripherals such as disk drives, a keyboard, and so on.

Slot is a location designed to accept an add-in card.

Figure 1:
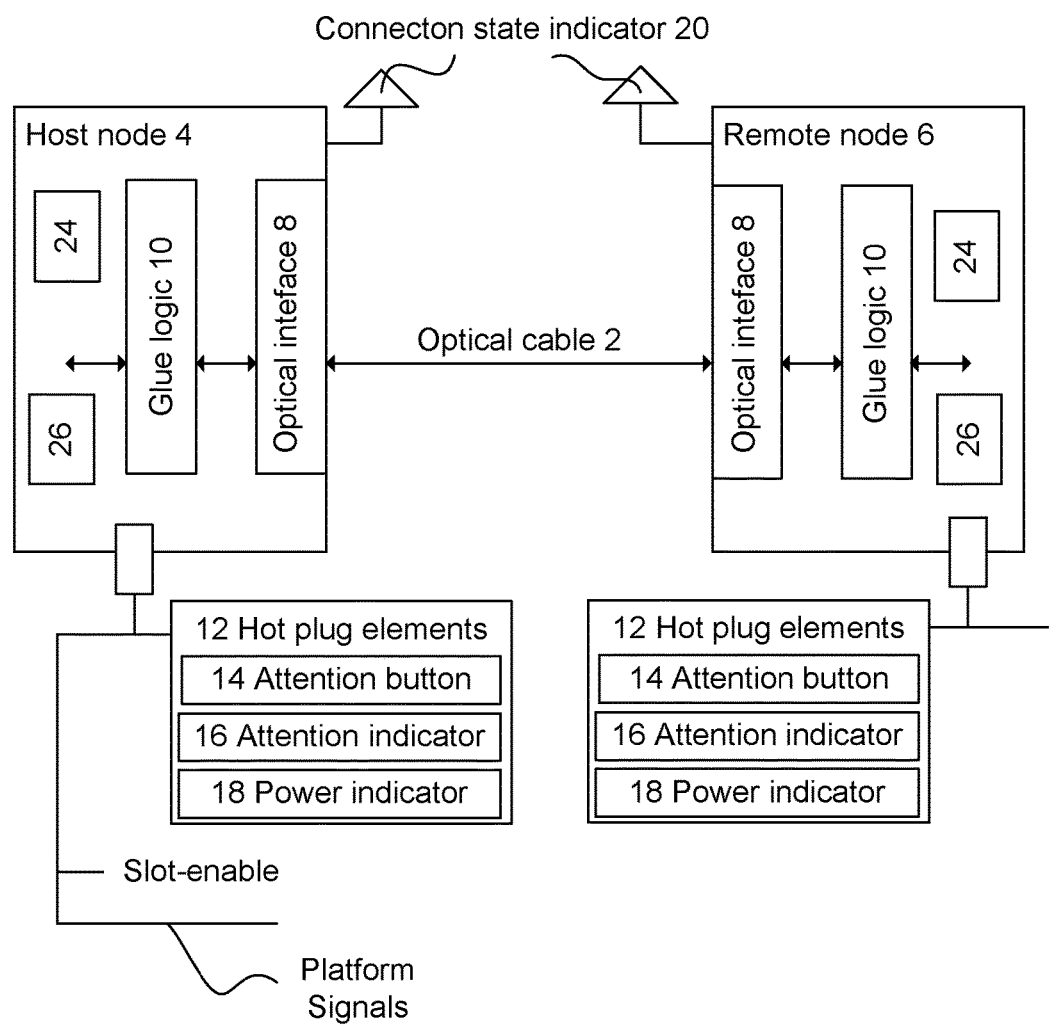
FIG. 1 shows an example embodiment of a hot-plug implementation.

FIG. 1 shows an example embodiment of a hot-plug implementation. The implementation shows a host node 4 and a remote node 6, which are connected to each other through an optical cable 2. Each node, i.e. both the host node 6 and the remote node 6, comprise an optical interface 8, glue logic 10, hot-plug elements 12, a connection state indicator 20, a hot-plug system driver and a hot-plug controller 26. The host node 4 may according to some embodiments be configured to receive information about the state of the PCIe hot-plug elements 12 of the remote node 6 via the optical cable 2. The host node 4 may for example be configured to receive this information at a frequency of 15-30 samples per second, preferably at a frequency of 20 samples per second.

In other embodiment the host node 4 may be reconfigurable and is configured such that the host node 4 removes information about the status of the PCIe hot-plug elements 12 of the remote node 6 from the host node 4. The information about the status of the PCIe hot-plug elements 12 comprises status about an attention button 14, an attention indicator 16 and a power indicator 18 of the remote node 6.

The optical interface 8 is configured for receiving the optical cable 2 such that the optical cable 2 may be used for communication between the host node 4 and the remote node 6. Preferably, the optical cable 2 is a fiber optical cable. The glue logic 10 is custom logic circuitry used for interfacing the communication received from the optical cable 2, via the optical interface 8, with the hardware and software components specified in the PCIe standard, such as the hot-plug system driver 24 and the hot-plug controller 26.

As mentioned above the hot-plug elements 12 comprise the attention button 14, the attention indicator 16 and the power indicator 18. There may be further hot-plug elements 12 as specified in current and future PCIe standards or the like. Each node 4, 6 also comprises, as mentioned above, the connection state indicator 20 which is used for indicating if there is an established connection between the host node 4 and the remote node 6 via the optical cable 2.

Figure 2:
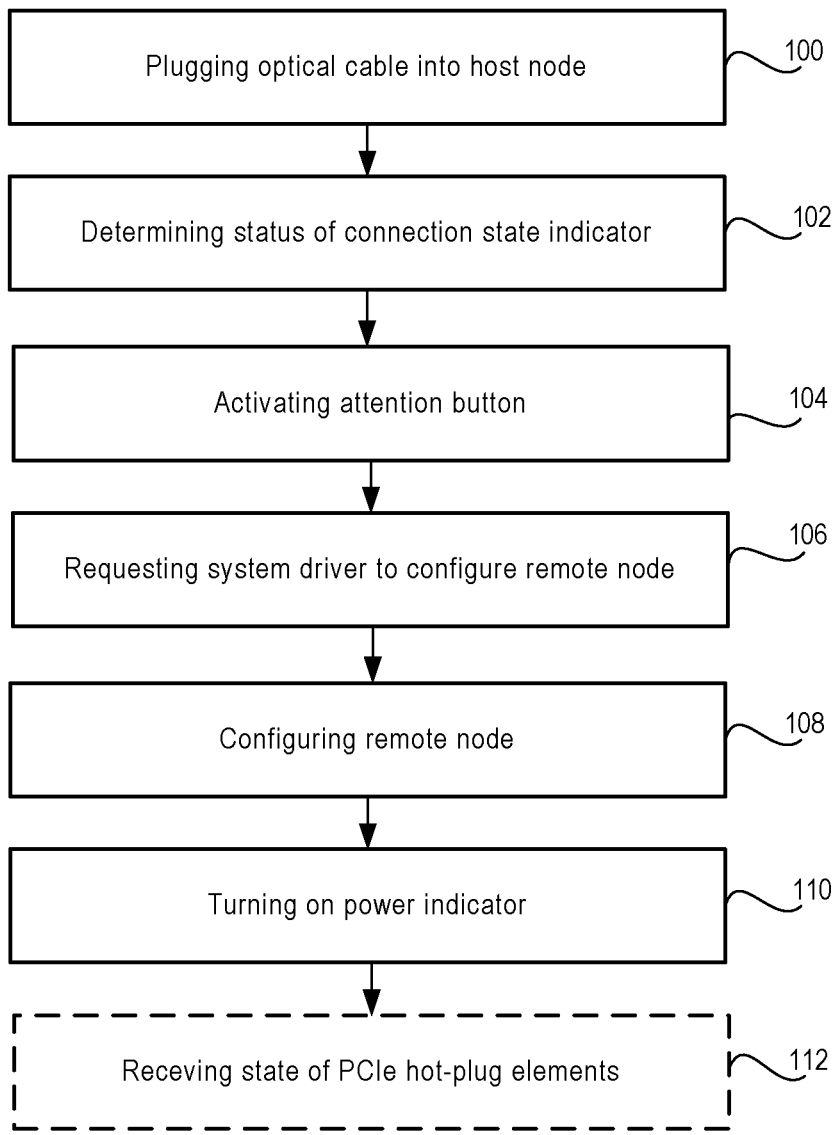
FIG. 2 shows a flowchart of a method for configuring a remote node according to an embodiment.

Turning now to FIG. 2 a method for configuring the remote node 6 according to an embodiment will be described. When starting this method it assumed that in the initial state all indicators, i.e. the attention indicator 16, the power indicator 18 and the connection state indicator 20 all are in an OFF state and that the optical cable 2 is unplugged.

The method is performed in the environment of FIG. 1, i.e. the remote node 6 is connected to a first end of an optical cable 2, which optical cable 2 is configured for communication between the remote node 6 and a host node 4. Each node 4; 6 also comprises the PCIe hot-plug elements 12 and the connection state indicator 20, i.e. the hot-plug elements have been duplicated at each end of the optical cable 2.

The method starts out in step 100, by plugging a second end of the optical cable 2 into the optical interface 8 of the host node 4. In step 102 the hot-plug controller 26 of the host node 4 determines the status of the connection state indicator 20 of the host node 4. If the connection state indicator 20 is off the hot-plug controller 26 waits until the connection state indicator 20 becomes on, indicating that an optical connection has been established between the host node 4 and the remote node 6. When the optical connection between the nodes 4;6 has been established the hot-plug controller 26 activates, in step 104, the attention button 14 of the hot-plug elements 12. This activation step 104 may be performed manually by an operator by pressing the attention button 14 or by an additional piece of hardware which emulates a button-press event in response to that the optical connection has been established. In response to the button press or emulated button press, a Light Emitting Diode, LED, of the power indicator 18 starts flashing. The power indicator 18 is flashing for five seconds during which time period it is possibly to manually abort the operation by again activating the attention button 14.

If no repeated activation of the attention button is detected within five seconds, the hot plug service of the host node 4 will issue a request, such that the hot-plug controller 26 requests, in step 106, the hot-plug system driver 24 of the host node 4 to configure the remote node 6. In step 108 the remote node 6 is then configured. In response to that the configuring process of the remote node 6 has been terminated the hot-plug controller 26, in step 110, turns on the power indicator 18 LED.

In a further embodiment the method may comprise receiving, in an optional step 112, at the host node 4, information about the state of the PCIe hot-plug elements 12 of the remote node 6 via the optical cable 2. In preferred embodiments the information about the state of the PCIe hot-plug elements 12 of the remote node 6 may be received at a frequency of 15-30 samples per second, preferably at 20 samples per second. The sample frequency and which state information of the remote node 6 to mirror to the host node 4 may be determined in a communication protocol for communication between the host node 4 and the remote node 6. This step will enable the possibility to mirror the state of buttons and indicators at the remote node 6 at the host node 4, such a hot-plug event at the remote node 6 will be detected at the host node 4.

Figure 3:
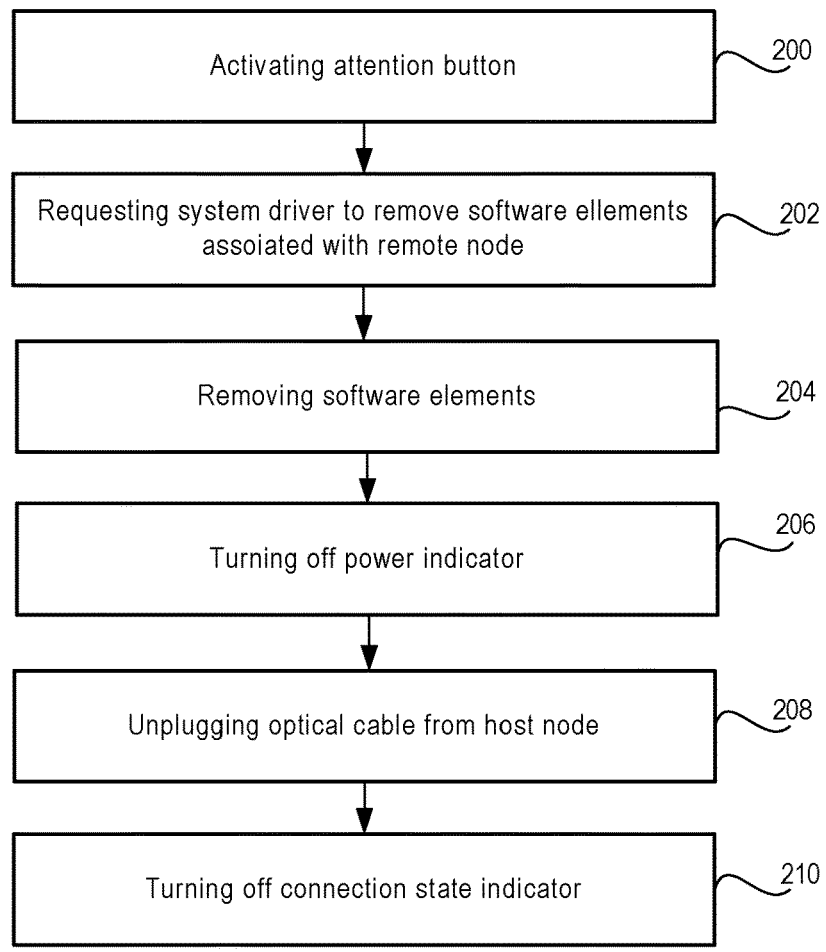
FIG. 3 shows a flowchart of a method for reconfiguring a host node according to another embodiment.

Turning now to FIG. 3 another method will be described for reconfiguring the host node 4. When starting this method it assumed that in the initial state both the power indicator 18 and the connection state indicator 20 are in an ON state that the optical cable 2 is plugged, i.e. there is an established connection between the host node 4 and the remote node 6.

Also this method is performed in the environment of FIG. 1, i.e. the optical cable 2 is configured for communication between the remote node 6 and a host node 4. Each node 4; 6 also comprises the PCIe hot-plug elements 12 and the connection state indicator 20, i.e. the hot-plug elements have been duplicated at each end of the optical cable 2.

The method starts out by activating, in step 200, the attention button 14 of the hot-plug elements 12, by means of the hot-plug controller 26 in the host node 4. The activation step 200 starts in response to a decision to remove the optical cable 2 from the optical interface 8 of the host node 4. When for example an operator pushes the attention button 14 the hot-plug controller 26 registers this and sets the attention button 14 in an activated state. In response to the activation of the attention button 14 the power indicator 18 LED starts flashing. Correspondingly as described in conjunction with FIG. 2 the power indicator flashes for five seconds, during which time period it is possible to abort the process. After five seconds, without repeated activation of the attention button 14, the hot plug service of the host node 4 will issue a request, such that the hot-plug controller 26 requests, in step 202, the hot-plug system driver 24 of the host node 4 to remove software elements associated with the remote node 6. In response thereto the hot-plug controller 26 removes, in step 204 the software elements associated with the remote node 6 from the host node 4. In response to the removal of the software elements associated with the remote node 6, the hot-plug controller 26 turns off, in step 206, the power indicator 18 LED. Thereafter, in step 208, the optical cable 2 is unplugged from the optical interface 8 of the host node 4 and in step 210 the connection state indicator 20 is turned off.

In some embodiments the step 204 of removing the software elements associated with the remote node 6 from the host node 4 comprises removing information about the state of the PCIe hot-plug elements 12 of the remote node 6 from the host node 4. The information about the state of PCIe hot-plug-elements 12 may comprises status about the attention button 14, the attention indicator 16 and the power indicator 18 of the remote node 6.

The methods shown in FIG. 2 and FIG. 3 describe the situation in which the optical cable 2 is plugged into or unplugged from the host node 4. However it should be understood that it may also be the other way around that the optical cable 2 instead is plugged into or unplugged from the remote node 6, which in such a case may be seen as a host node and the host node is then seen as the remote node.

Figure 4:
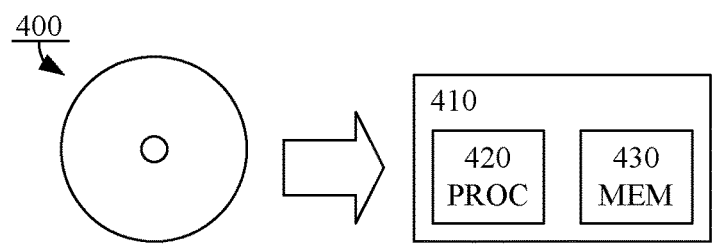
FIG. 4 illustrates another embodiment in the form of a computer program.

Turning now to FIG. 4, yet another embodiment is disclosed. FIG. 4 illustrates a computer program comprising instructions which, when executed on at least one processor 420 in a node 410, which includes memory 430, will cause the node 410 to perform any of the methods described in conjunction with FIG. 2 and FIG. 3. A carrier may comprise the above-mentioned computer program. The carrier may be a computer readable storage medium 400. Alternatively, the carrier may be one of an electronic signal, optical signal, or radio signal. In one embodiment, the node 410 may be a host node and in another embodiment the node 410 may be a remote node.

With the above described embodiments it is possible to use the hot-plug functionality even for remote locations connected to a host via an optical cable, without the need for an operator to visit either ends or the need of assistance of another operator. This is done by implementing the connection state indicator at both cable ends, i.e. at the host node and the remote node in order to establish that there is an optical connection between the host node and the remote node. Furthermore, the hot-plug elements, attention button, attention indicator and power indicator need to be duplicated at both cable ends. With this setup it is possible to use only a small amount of additional bandwidth along the optical path in the optical cable between the host node and the remote node to mirror the state of the above hot-plug elements at the remote node in the host node.

In the detailed description hereinabove, for purposes of explanation and not limitation, specific details are set forth such as particular architectures, interfaces, techniques, etc. in order to provide a thorough understanding of various embodiments. In some instances, detailed descriptions of well-known devices, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of the structure. Thus, for example, it will be appreciated by those skilled in the art that block diagrams herein may represent conceptual views of illustrative circuitry or other functional units embodying the principles of the embodiments. Similarly, it will be appreciated that any flow charts and the like represent various processes which may be substantially represented in computer readable medium and so executed by a computer or processor, whether or not such computer or processor is explicitly shown. The functions of the various elements, including functional blocks, may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Modifications and other variants of the described embodiments will come to mind to one skilled in the art having benefit of the teachings presented in the foregoing description and associated drawings. Therefore, it is to be understood that the embodiments are not limited to the specific example embodiments disclosed and that modifications and other variants are intended to be included within the scope of this disclosure. Although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. Also, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims. In addition, singular references do not exclude a plurality. Finally, reference signs in the claims are provided merely as a clarifying example and should not be construed as limiting the scope of the claims in any way.

The invention claimed is:

1. A method for configuring a remote node connected to a first end of an optical cable, said optical cable being configured for communication between the remote node and a host node, the method comprising:
providing, on the host node, Peripheral Component Interconnect express, PCIe, hot-plug elements and a connection state indicator, the PCIe hot-plug elements on the host node being duplicates of PCIe hot-plug elements on the remote node;
plugging a second end of the optical cable into the host node;
determining, by a hot-plug controller in the host node, a status of the connection state indicator of the host node;
activating, by the hot-plug controller, an attention button of the hot-plug elements in response to determining that the connection state indicator indicates that an optical connection has been established between the remote node and the host node;

requesting, by the hot-plug controller, a hot-plug system driver of the host node to configure the remote node;

performing a configuring process of the remote node;

turning on, by the hot-plug controller, a power indicator Light Emitting Diode, "LED", in response to that the configuring process of the remote node has been terminated; and receiving, at the host node, information about a state of the PCIe hot-plug elements of the remote node via the optical cable.

2. The method according to claim 1, wherein the information about the state of the PCIe hot-plug elements of the remote node is received at a frequency of 15-30 samples per second.

3. A host node for configuring a remote node, the host node comprising:

an optical interface for receiving a second end of an optical cable, the first end of which is connected to an optical interface of the remote node, said optical cable being configured for communication between the remote node and a host node;

Peripheral Component Interconnect express, PCIe, hot-plug elements and a connection state indicator, the PCIe hot-plug elements on the host node being duplicates of PCIe hot-plug elements on the remote node; and processing circuitry configured to perform the following steps in response to the second end of the optical cable being plugged into the optical interface of the host node:

determine, by a hot-plug controller in the host node, a status of the connection state indicator of the host node;

activate, by the hot-plug controller, an attention button of the hot-plug elements in response to determining that the connection state indicator indicates that an optical connection has been established between the remote node and the host node;

request, by the hot-plug controller, a hot-plug system driver of the host node to configure the remote node;

perform a configuring process of the remote node;

turn on, by the hot-plug controller, a power indicator Light Emitting Diode, "LED", in response to that the configuring process of the remote node has been terminated; and receive information about a state of the PCIe hot-plug elements of the remote node via the optical cable.

4. The host node according to claim 3, wherein the processing circuitry is further configured to receive the information about the state of the PCIe hot-plug elements of the remote node at a frequency of 15-30 samples per second.

5. A computer program product comprising code to perform all the steps of claim 1, when executed in a computer.

6. A method for reconfiguring a host node connected to a remote node via an optical cable, said optical cable being configured for communication between the host node and the remote node, the method comprising:

providing, on the host node, Peripheral Component Interconnect express, PCIe, hot-plug elements and a connection state indicator, the PCIe hot-plug elements on the host node being duplicates of PCIe hot-plug elements on the remote node;

activating, by a hot-plug controller in the host node, an attention button of the hot-plug elements in response to a decision to remove the optical cable from the host node;

requesting, by the hot-plug controller, a hot-plug system driver of the host node to remove software elements associated with the remote node;

removing the software elements associated with the remote node from the host node;

turning off, by the hot-plug controller, a power indicator Light Emitting Diode, "LED", in response to that the software elements associated with the remote node have been removed;

unplugging the optical cable from the host node;

turning off the connection state indicator; and receiving, at the host node, information about a state of the PCIe hot-plug elements of the remote node via the optical cable.

7. The method according to claim 6, wherein the information about the state of PCIe hot-plug-elements comprises information associated with a state of an attention button, an attention indicator and a power indicator of the remote node.

8. A reconfigurable host node connected to a remote node, the reconfigurable host node comprising:

an optical interface connected to an optical cable, said optical cable being configured for communication between the host node and the remote node;

Peripheral Component Interconnect express, "PCIe", hot-plug elements and a connection state indicator, the PCIe hot-plug elements on the host node being duplicates of PCIe hot-plug elements on the remote node; and processing circuitry configured to perform the following steps when the optical cable is unplugged from the optical interface of the host node:

activate, by a hot-plug controller in the host node, an attention button of the hot-plug elements in response to a decision to remove the optical cable from the host node;

request, by the hot-plug controller, a hot-plug system driver of the host node to remove software elements associated with the remote node;

remove the software elements associated with the remote node from the host node;

turn off, by the hot-plug controller, a power indicator Light Emitting Diode, "LED", in response to that the software elements associated with the remote node have been removed;

unplug the optical cable from optical interface of the host node;

turn off the connection state indicator; and receiving, at the host node, information about a state of the PCIe hot-plug elements of the remote node via the optical cable.

9. The reconfigurable host node according to claim 8, wherein the information about the state of PCIe hot plug-elements comprises information associated with a state of an attention button, an attention indicator and a power indicator of the remote node.

10. A computer program product comprising code to perform all the steps of claim 6, when executed in a computer.

* * * * *